Jan. 6, 1925.
W. E. TRENT
1,521,917
METHOD AND APPARATUS FOR TREATING MATERIALS
Filed June 25, 1919
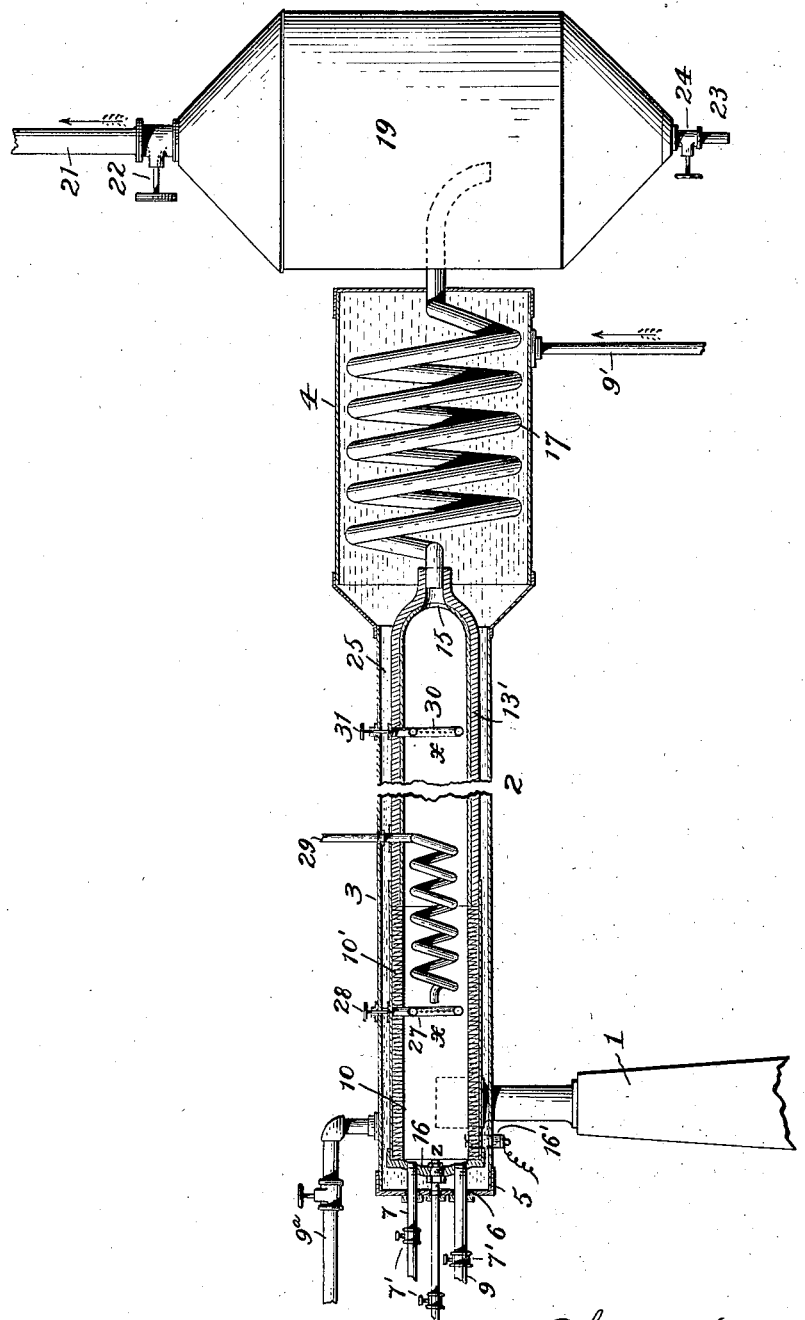

Patented Jan. 6, 1925.

1,521,917

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION, OF WASHINGTON, DISTRICT OF COLUMBIA, A CORPORATION OF DELAWARE.

METHOD AND APPARATUS FOR TREATING MATERIALS.

Application filed June 25, 1919. Serial No. 306,647.

*To all whom it may concern:*

Be it known that I, WALTER E. TRENT, a citizen of the United States, residing at Washington, in the District of Columbia, have invented certain new and useful Improvements in Methods and Apparatus for Treating Materials, of which the following is a specification, reference being had therein to the accompanying drawing.

The invention relates to an apparatus and method for treating ores, chemicals, minerals and the like to change the state or condition of the material treated. The invention in its broader aspects is applicable to oxidizing, reducing, melting, smelting, volatilizing, chloridizing, sulphating, or sulphidizing processes.

The material to be treated is very finely ground, introduced directly into, and entrained by hot furnace gases, and treated either above or below volatilizing temperatures to bring about a change of state while entrained, and then recovered in the new condition.

In smelting when the lumps are large a material period of time is required to cause the reactions desired as only their surfaces are exposed to the heat of the blast. The inner parts of the lumps can receive the desired heat treatment by only the wearing away or smelting of the lump surfaces. This requires a continuous passage of hot blast in contact with the charge until the lumps are completely smelted and consequently there is a large waste of heat and time. Under these conditions only a small portion of the heat of the fuel is utilized in the treatment of a charge, a material percentage of the heat developed passing out through the stack. Further, when the material undergoing treatment is in coarse lumps, there cannot be that close contact and mixture of the component parts of the charge which is necessary for the uniting of the different substances to form slags, therefore in these prior art processes even after the coarse materials have been sufficiently heated to bring about the desired reaction, their temperature must be maintained while they slowly form the combinations desired at their limited points of contact.

The present invention comprises a method or process for reducing, oxidizing, smelting, melting, chloridizing, sulphating, sulphidizing, volatilizing, or the general treatment of any ore or material to change its condition or state by a heat treatment, or a combined heat and chemical treatment. The method consists in introducing the material to be treated in such a fine state of division directly to the heated blast or flame that it will be entrained and carried by the blast, undergoing treatment while traveling in suspension therein, and in collecting the material from the blast after its treatment. In carrying out the method the blast is under pressure and velocity and is also of a regulatable variable temperature.

The process also includes the provision of a flame having a reducing, oxidizing, or neutral effect, in accordance with the needs of the material undergoing treatment, which effects result from an excess quantity of carbon, or of oxygen or of a normal mixture of air and fuel.

A highly important feature of the present method resides in the introduction of a treating agent to the furnace or blast, prior to feeding the finely divided charge, if said charge material requires the presence of a substance to give a desired reaction. For example, the introduction of sodium chloride (or common salt) would cause certain metals including lead and silver to become chloridized thus rendering them easy to volatilize or leach.

In practicing the method, gases of combustion are generated under a desired pressure, velocity and temperature, possessing the necessary characteristics above referred to, produced by the regulation of the relative quantities of fuel and air, and the application of other agents to the flame, so that when a flame or gases of combustion is being produced of a proper nature, the extremely fine particles of material or ore to be treated are introduced directly thereto, the material being so fine as to be rapidly treated while being carried in suspension in the blast. It has been stated that the material is to be of such a fine state as to be carried in suspension in the blast, and in treating some substances that are composed of mixtures of different materials, it is desirable to grind the same to a fineness that will result in a physical separation of the materials before introduction to the blast.

By grinding the charge into an impalpable mass, the most rapid treatment is made possible, because the particles have the maximum surface exposed to the heat and treating substances, practically no thickness or interior to be penetrated, and practically no contact between the surfaces of the particles to retard gases leaving the particles after being formed.

Assuming that a finely pulverized iron oxide is introduced to the blast which has a reducing effect by reason of the presence of carbon monoxide, the iron particles are almost instantly converted into metallic particles and are then collected from the gases for any further treatment, if necessary. It has been found that where the iron ore is treated in a reducing gas, made from fixed carbon fuel substantially free of hydrocarbons, a complete reduction of the ore to a metallic state is effected. This is not so if the iron ore is subjected to the reducing gas generated from hydrocarbon, as sufficient carbon monoxide is not present to completely reduce the ore to the desired metallic state. If a finely pulverized sulphide of iron is introduced into the flame or products of combustion having an excess of oxygen, the pulverized or finely divided iron sulphide is converted to an iron oxide, the excess oxygen combines with the sulphur forming $SO_2$ gas. It has also been found that if a small quantity of water is introduced to the furnace or blast, part or all of this water will be converted by the intense temperature into its component parts, nascent oxygen and hydrogen and if the flame has additional oxygen due to an excess of air, the introduction of the iron sulphide particles into the flame will cause a change of the iron to the form of oxide, and $SO_2$ gas will be formed which on account of the presence of nascent oxygen due to the decomposition of the water will effect a further combination with the nascent oxygen forming $SO_3$ gas which is the important and difficult step now experienced in the manufacture of sulphuric acid. If desirable, gases may be used to provide the additional oxygen to the flame, instead of decomposing water introduced thereto, in which vent the entrance of water to the flame can be eliminated and the acid gases introduced thereto will bring about a change of the gases in the chamber from $SO_2$ to $SO_3$ gases.

The material or ore, in its finely divided condition, is introduced into the furnace blast, or gases, which are under pressure and velocity, to be carried therewith while undergoing treatment. To regulate and vary the temperature of the blast or flame, a fluid is introduced thereto, or the chamber surrounded with a water jacket through which water circulates under pressure. It is highly desirable to have the temperature of the blast under instant control. As ores or minerals of different characters react at different temperatures and the regulation of the temperature before the admission of the charge as in the present method permits the oxidizing, reducing, smelting, etc., of substances at their proper temperatures but prevents their partial volatilization if this is undesirable. It will, therefore, be seen that in treating ores or materials of different characters a variable temperature of the blast is essential, and to this end in carrying out the present method the blast passing to the heating zone is variable and regulatable by the introduction of a fluid directly thereto, either alone or with the ore, or by surrounding the chamber with a jacket. When the ore and a fluid are introduced together to the action of the heated flame or products of combustion, the fluid serves to liquefy the finely divided ore or material, this permitting the same to be easily pumped or introduced to the blast under pressure, and also, as before stated, to assist in varying and regulating the temperature of the blast.

When it is found desirable to volatilize materials or ores for treatment, the temperature of the heating blast, being under instant control, is held at the desired high degree, and the charge is then introduced thereto and volatilized, the vapors being condensed and collected and separated from the gases.

The temperature of the flame is preferably controlled as before stated, by the introduction of water to the blast or flame, or surrounding the treating chamber with a cooling medium, it being contemplated, however, to regulate the temperature of the furnace gases or blast according to the requirements, both before the charge is introduced for treatment, and also during the time when the charge is being carried in suspension in the blast or flame and undergoing treatment. The introduction of a fluid to the blast at a time when the pulverized substance is undergoing treatment is highly desirable in treating a substance which gives off heat during treatment, and sufficient cooling is, therefore, accomplished during the imparting of the extra heat from the substance being treated to the blast, to maintain a substantially uniform temperature.

In feeding ore to the gases of combustion or blast the same may be introduced thereto in its finely divided condition alone, or may be mixed with powdered coal, fuel oil or water. The water or fuel oil when used with the charge serves to liquefy the same thereby facilitating its introduction under pressure to the gases. The oil or pulverized coal if introduced with the ore will cause a strong reducing reaction in the treatment zone, and the generation of additional heat for creating and maintaining the desired temperature therein.

It has been stated that the heat and chemical changes desired take place almost instantly while the charge is being carried by the blast. At the time and point at which this change has been completed the substances and particles are cooled by the introduction of water directly into the furnace blast which gathers and entrains all of the solid particles and forms an emulsion of water, solid particles, and gases. This mixture will discharge into a chamber of enlarged area so that the water, together with the solid particles mixed with it, will collect in the bottom of this chamber, and the gases, robbed of all solid particles, and robbed also of all volatile substances which will condense of precipitate upon cooling, will ascend to the top of the chamber. The sludge, or emulsion, of water and solid particles can be let out of a controlled opening and the material, having undergone the desired change of state, can be conducted away for further simple and well known treatments if necessary. The gases which collect in the top of the chamber can be permitted to pass out of a controlled opening, either for further treatment or to waste.

In the accompanying drawings I have shown a form of apparatus which is capable of supporting the present method, but obviously any other suitable apparatus may be employed that will be capable of carrying out this method.

In the drawings,—

The figure is a side elevation with parts in section showing the treating zone broken away.

Referring now more particularly to the drawings wherein like reference characters indicate corresponding parts, the numeral 1 designates a suitable support upon which the apparatus is mounted, in the present illustration the same taking the form of a post, but obviously any convenient means may be employed for supporting the apparatus.

Mounted upon the support 1 is the ore or mineral treating apparatus 2 preferably consisting of an outer shell or jacket 3 of a metallic formation being somewhat widened at one end and constituting a cooling chamber 4. The widened end of the apparatus is removable from the other portion thereof, and this end is also formed with a suitable closure, the narrow end of the apparatus being likewise provided with a movable closure plate 5 having a plurality of openings 6 therein for the passage of the air pipe 7, the oil pipe 8, and the treating substance pipe 9, the purposes of which will hereinafter appear.

Disposed within the shell 2 and spaced therefrom throughout its length as well as at each end to provide a water reservoir is a chamber 10, having a lining 10' of tile, fire brick, or any suitable material to withstand heat generated therein, the chamber 10 at one end being encased by a metallic covering, and from a point, substantially at its center to the opposite end thereof, a metallic casing is also employed being in the nature of a casting 13' somewhat thicker than the casing for the first half of the chamber. The water reservoir is fed with water under pressure by the pipe 9' and this water is carried therefrom by the pipe 9ª. The chamber near this end terminates in a discharge opening 15, while the other end of the chamber is provided with a cap plate 16 having flanges fitting around the sides thereof and orifices passing therethrough receiving the pipes 7, 8 and 9 which are adapted to be in communication with different supply reservoirs, the pipes all having controlling valves 7' disposed therein for regulating and varying the quantity of fuel, air or treatment substance to enter the chamber 10.

The chamber 10 is supported in the position shown in the drawings by a saddle 12 mounted upon the upper end of the supporting post 1 and passing through the outer shell 2. While this form of supporting means is highly efficient, any other form of support can be readily used.

The fuel and air entering the chamber through the feed pipes 7 and 8 continuously burns therein, and to start combustion of the fuel when the apparatus is cold, a spark plug 16' in circuit with a battery or generator is employed, it being manifest that after a short period the combustion chamber will heat to such a degree as to support combustion of the fuel entering the chamber, which combustion is continuous due to the continuous feed of the fuel that may be oil or pulverized coal and the air. By manipulating the valves 7' in the oil and fuel feed pipes the quantities of fuel and air admitted to the chamber are under instant control and may be varied at will, this being highly essential in carrying out the present method so that an excess quantity of oxygen may be admitted for burning, or very little oxygen be admitted, the additional oxygen required to be supplied by the ore or mineral that is to undergo treatment.

The oil and air being introduced to the combustion chamber through the pipes 7 and 8, of course, burns, combustion starting at the point Z in the chamber, and to regulate the temperature of the flame or blast after combustion between the points indicated by the reference characters X which may be designated as a treatment zone, a water spray 27 is employed having a plurality of jet openings therein, the entrance of water to the spray from the jacket 25 being controlled by the needle valve 28 so as to vary or entirely cut off the flow of water to absorb heat of the furnace of combustion thereby cooling the same. When water is admitted to the furnace through the spray nozzles, the intense heat of the products of combustion is absorbed therein, reducing the temperature of the blast from the time it comes in contact with the water and obviously the quantity of water admitted to the heated gases varies and controls its temperature.

Ore or other materials is introduced to the treating zone X—X through the pipe 29 passing through the shell 2 and the chamber and then taking a spiral course within the chamber towards the fuel and air discharge pipes, discharging the ore at the entrance of the treatment zone directly into the products of combustion and blast. The ore introduced through this pipe is first ground very fine or to a state of division so fine as to be suspended in the blast and carried therewith and then it is preferably liquefied by the addition of a regulated or controlled quantity of water which may be varied at will, the water serving to assist in conveying the powdered ore to the treatment zone and when discharged therein absorbs a part of the intense heat of the products of combustion to regulate the temperature thereof. When the plant is in operation the ore is being introduced directly to the products of combustion or flame in a powdered form or finely divided state with or without water, the same is rapidly treated by the products of combustion, and carried in suspension thereby while undergoing treatment, it being understood that the products of combustion or flame is under pressure within the chamber and continuously moving towards the discharge opening 15.

The ore to be treated may be of any character, and if an oxidized ore that is to be reduced to a metallic state, it is introduced to the treatment zone, the same immediately undergoing a change of state, and to collect said particles after change of state or condition brought about by the influence of the heat in the treatment zone, a supply of water is introduced to the chamber through the spray 30 controlled by the valve 31, serving to bring about a condensing of the steam mixed with the gases and the ore and furnish additional water to serve in collecting the treated ore etc. The condensing continues after the introduction of water and during the passage of the steam, air and ore through the condensing coil 17, the steam is returned to its natural state, the water serving to collect the solid particles or minerals into sludge or emulsion in which form they are conveyed to the tank 19, the solid particles and water passing to the lower portion of the tank while the gases discharge through the pipe 21 controlled by the valve 22. The sludge is removed from the tank through pipe 23 controlled by valve 24.

In many instances it is desirable to introduce to the combustion chamber a treating agent such as sodium chloride or common salt when different ores or materials are to be treated, especially gold or silver ores, this agent being admitted through the treatment supply pipe 9 controlled by its valve 7', the treating substance serving to render the ore subject to easy volatilization, leaching or the like and manifestly the form or kind of substance admitted to the chamber is dependent upon the nature of the ore to be treated, it being sufficient to say that any chemical agent or substance of any kind may be admitted to the flame should such an agent be required in the proper treatment of the ores.

The ore, or material before treatment, is, of course, ground or pulverized in any approved manner until it is in a very fine state of division, and as a matter of fact usually in an impalpable mass. The finely powdered ore is then introduced through the pipe 29 into the treating zone of the chamber 10 directly into the flame or gases of combustion produced by the burning of the air and fuel permitted to enter the chamber from the pipes 7 and 8, the temperature of the flame or gases having been regulated by the admission of a predetermined quantity of water through the coil 27 into the flame or blast prior to the arrival of the flame to the treating zone. The ore thus introduced in this finely divided state, is substantially instantaneously treated to bring about the desired reaction or change in state, being entrained or carried in the gases of combustion under a pressure and velocity through the treating zone, undergoing treatment during this entire period of travel. After the passage and treatment of the ores or minerals through the zone, additional water is admitted directly to the gases, steam and treated ores, through the spray 30 serving to condense the steam and supply additional water to the blast thus collecting the solid particles and forming an emulsion or sludge consisting of the particles of ore or mineral after they have under-treatment, which sludge passes through the condensing coil in the condensing chamber and is deposited in the lower portion of the tank 19. While the condensing of the steam begins upon the injection of water through the spray 30, this condensing continues through the entire travel of the ore, water, steam and gases through the condensing coil 17 surrounded by water under pressure, the sludge or emulsion being then delivered to the tank 19 while the gases are permitted to discharge through the pipe 21 controlled by the valve 22. It will be understood that this form or means for collecting the fine particles of ore or other material after it has undergone treatment is only a preferred construction capable of supporting the method, but manifestly any other suitable means by which the treated particles can be recovered and separated from the gases may be used. The fuel and air introduced to the combustion chamber begins burning, as before stated, at approximately the point Z, the flame or products of combustion being under pressure so that after generation the blast passes rapidly on through the treatment zone indicated by the reference characters X—X. The finely pulverized charge is introduced to this zone in the path of travel of the gases being taken up or entrained therein to bring about the desired reaction. In the treatment of many ores, chemicals or minerals, a variable temperature is necessary to bring about the desired change of state, and the temperature of the gases in following the present method, prior to the entrance thereof to the treatment zone, is under instant regulation due to the injection of water through the water spray 27, the water serving to absorb part of the heat of the gases and thereby regulate their temperature.

It will, therefore, be seen that the gases prior to receiving the finely pulverized fuel are of a desired temperature which temperature is variable and regulatable so as to bring about the desired reaction of the chemicals or ores being treated. The water thus introduced for keeping down the temperature as well as the water introduced with the ore is evaporated and this water when later condensed after the passage of the steam through the treatment chamber serves to assist in collecting the treated particles of ore or other substance that has passed through the treatment zone to be later conveyed to the collecting tank 19. In the treatment of many ores, an excess quantity of oxygen is needed to bring about a proper reduction of the ore, and in carrying out this process this oxygen is supplied by opening the controlling valve 7' in the air feeding pipe 7 so as to allow a large volume of air to be introduced to the combustion chamber to mix with the fuel. This will, obviously, supply the necessary oxygen in the event a sulphide ore is being reduced and manifestly other oxygen will likewise be supplied by the decomposition of the water introduced to the combustion gases or flame through the different water inlets. If the ore is of a nature that in itself will supply oxygen when undergoing treatment, which may be any oxide ore, then the quantity of air is controlled in the chamber to bring about the reduction of the ore or chemical undergoing treatment.

If an ore, or other material, is to be volatilized, then the temperature of the chamber is raised to a very high degree by maintaining a proper mixture of the fuel and air and by introducing little or no water to the gaseous products of combustion. After the ore has been volatilized by its entrainment in the hot blast, to collect the same the vapors thereof are condensed by passing through the condensing coil and conveyed to the tank 19 where the gases are allowed to escape and the condensed ore is recovered.

By the terms blast, heating blast, in the claims, it is to be understood that the same are to be construed in their broadest sense and mean a flame, gases, etc.

Having thus described the invention, what I claim is:

1. The process of treating material to change the state thereof which consists in introducing a material in a finely divided state to a heating blast, in regulating the temperature of the blast by injecting water thereto prior to the introduction of the material to the blast, in introducing additional water to the material and heating blast after the treatment of the material to condense the steam in the blast and collect the treated material in the body of water in the form of a sludge and in allowing the heating blast to escape.

2. The herein described method of treating materials to change the condition thereof which consists in introducing to a treatment zone a heating fluid, in conveying to the heating fluid material in a finely pulverized condition incorporated in a liquid to be entrained and treated during such entrainment by the heating fluid to change the state or condition thereof, and in collecting said treated material by condensing the liquid introduced to the heating fluid and allowing the heating fluid to escape.

3. An apparatus for treating ore and other material comprising a chamber, means for introducing and controlling the relative quantities of air and fuel to the chamber for burning, means for introducing a fluid to the gases to regulate the temperature thereof, means for introducing ore in a finely divided state to the gases after the temperature thereof has been regulated to be carried in suspension in the gases and treated to change the state thereof while entrained in the gases, and means for collecting the material after such treatment.

4. An apparatus for treating ore and other materials comprising a chamber, means for introducing and controlling the relative quantities of air and fuel to the chamber for burning, means for introducing a fluid to the gases to regulate the temperature thereof, means for introducing ore in a finely divided state to the gases after the temperature thereof has been regulated to be carried in suspension in the gases and treated to change the state thereof while entrained in the gases, means for condensing the fluid admitted to the gases after the material has undergone a treatment to produce a fluid serving to collect the treated ore, and means receiving the treated ore and fluid in the nature of an emulsion permitting the escape of the gases.

5. The process of treating materials which consists in introducing to a treating zone fuel and air under pressure to form a blast, in regulating the temperature of the blast by introducing a cooling medium thereto at the entrance of the blast to the treating zone, in introducing to the blast a finely divided material to be carried in suspension therein, in maintaining the temperature of the blast constant during its passage through the zone, and in finely collecting the treated materials from the blast by introducing to the blast a liquid to collect as a sludge the treated materials, 6. The process of treating ores which consists in introducing to a heating gas finely divided ore, in maintaining the temperature of the gas sufficiently high to volatilize components of the ore, and in condensing and collecting the volatilized substances.

7. The process of treating ores, minerals and the like, which comprises introducing very fine materials to a heating flame, in subjecting the materials to heat treatment to cause volatilization of certain components while in suspension and a chemical change of other portions of the material, and in condensing and collecting the volatilized substances together with the other portions of the material.

In testimony whereof I hereunto affix my signature in the presence of two witnesses.

WALTER E. TRENT.

Witnesses:
 THOMAS DURANT,
 CHARLES M. THOMAS.